(12) United States Patent
Ishige

(10) Patent No.: US 9,466,110 B2
(45) Date of Patent: Oct. 11, 2016

(54) IMAGE PROCESSING DEVICE THAT ANALYZES MOTION OF OBJECT

(71) Applicant: CASIO COMPUTER CO., LTD., Shibuya-ku, Tokyo (JP)

(72) Inventor: Yoshiki Ishige, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 30 days.

(21) Appl. No.: 13/846,857

(22) Filed: Mar. 18, 2013

(65) Prior Publication Data

US 2013/0251200 A1 Sep. 26, 2013

(30) Foreign Application Priority Data

Mar. 21, 2012 (JP) ................................. 2012-064533

(51) Int. Cl.
| | | |
|---|---|---|
| *G06K 9/00* | (2006.01) | |
| *G06T 7/00* | (2006.01) | |
| *G06T 7/20* | (2006.01) | |

(52) U.S. Cl.
CPC .......... *G06T 7/004* (2013.01); *G06K 9/00342* (2013.01); *G06T 7/0038* (2013.01);
(Continued)

(58) Field of Classification Search
CPC .......... G06T 2207/10016; G06T 7/20; G06T 7/004; G06T 7/2006; G06T 7/0042; G06T 2207/30232; G06T 7/0044; G06T 7/0071; G06T 1/0007; G06T 2207/30221; G06T 7/2033; G06T 2207/30224; G06T 2207/30241; G06T 7/2093; G06T 7/604; G06T 2207/10021; G06T 7/2086; A63B 24/0003; A63B 69/3614; A63B 69/3658; A63B 2220/30; A63B 69/36; A63B 2243/0029; A63B 24/0006; A63B 2024/0012; A63B 2024/0015; A63B 2069/3605; A63B 55/00; A63B 57/00; A63B 69/3667
USPC ....................................................... 382/103
See application file for complete search history.

(56) References Cited

U.S. PATENT DOCUMENTS 5,999,877 A * 12/1999 Takahashi .......... G06K 9/00785
340/905
6,560,399 B2 * 5/2003 Sato et al. .................... 386/207

(Continued)

FOREIGN PATENT DOCUMENTS

| | | | |
|---|---|---|---|
| CN | 101564594 A | 10/2009 | |
| CN | 101610715 A | 12/2009 | |

(Continued)

OTHER PUBLICATIONS

Korean Office Action dated Mar. 26, 2014 (and English translation thereof) in counterpart Korean Application No. 10-2013-0030242.

(Continued)

Primary Examiner — Alex Liew
(74) Attorney, Agent, or Firm — Holtz, Holtz & Volek PC

(57) ABSTRACT

In an image processing device (1), the motion detection unit (43) extracts an outline indicating a body from an image of each frame in moving image data of a player and sets a motion reference axis(line) to each part of the body. Then, the motion comparison unit (44) compares a moving image of the player and a moving image of a professional golfer based on a motion of a main motion reference axis(line) and generates moving image data for comparison to which comparison result data is added. Based on this moving image data for comparison, the comparison result display control unit (45) distinguishably displays a difference between the moving image of the player and the moving image of the professional golfer.

20 Claims, 10 Drawing Sheets

(52) U.S. Cl.
CPC ... *G06T 7/2046* (2013.01); *G06T 2207/10016* (2013.01); *G06T 2207/30196* (2013.01); *G06T 2207/30221* (2013.01); *G06T 2207/30241* (2013.01)

(56) References Cited

U.S. PATENT DOCUMENTS

| | | | |
|---|---|---|---|
| 8,328,691 B2 | 12/2012 | Lanfermann et al. | |
| 2004/0096085 A1* | 5/2004 | Matsumoto et al. | 382/107 |
| 2006/0029269 A1* | 2/2006 | Matsuoka | 382/132 |
| 2006/0147128 A1* | 7/2006 | Kondo et al. | 382/300 |
| 2010/0145232 A1* | 6/2010 | Jang | A61B 5/0064 600/587 |
| 2012/0206597 A1* | 8/2012 | Komoto et al. | 348/135 |

FOREIGN PATENT DOCUMENTS

| | | |
|---|---|---|
| JP | 10145724 A | 5/1998 |
| JP | 10-304299 A | 11/1998 |
| JP | 2003117045 A | 4/2003 |
| JP | 2005198818 A | 7/2005 |
| JP | 2006181014 A | 7/2006 |
| JP | 2010-517731 A | 5/2010 |
| JP | 2011062352 A | 3/2011 |
| JP | 2011152333 A | 8/2011 |
| KR | 10-2003-0041034 A | 5/2003 |
| KR | 100772497 B1 | 11/2007 |

OTHER PUBLICATIONS

Korean Office Action dated Jan. 9, 2015, issued in counterpart Korean Application No. 10-2014-0150098.
Chinese Office Action (and English translation thereof) dated Oct. 28, 2015, issued in counterpart Chinese Application No. 201310091740.6.
Korean Office Action (and English translation thereof) dated Nov. 24, 2015, issued in counterpart Korean Application No. 10-2014-0150098.
Japanese Office Action (and English translation thereof) dated Nov. 12, 2015, issued in counterpart Japanese Application No. 2014-227697.
Japanese Office Action (and English translation thereof) dated Apr. 19, 2016, issued in counterpart Japanese Application No. 2014-227697.
Chinese Office Action (and English translation thereof) dated May 18, 2016, issued in counterpart Chinese Application No. 201310091740.6.

* cited by examiner

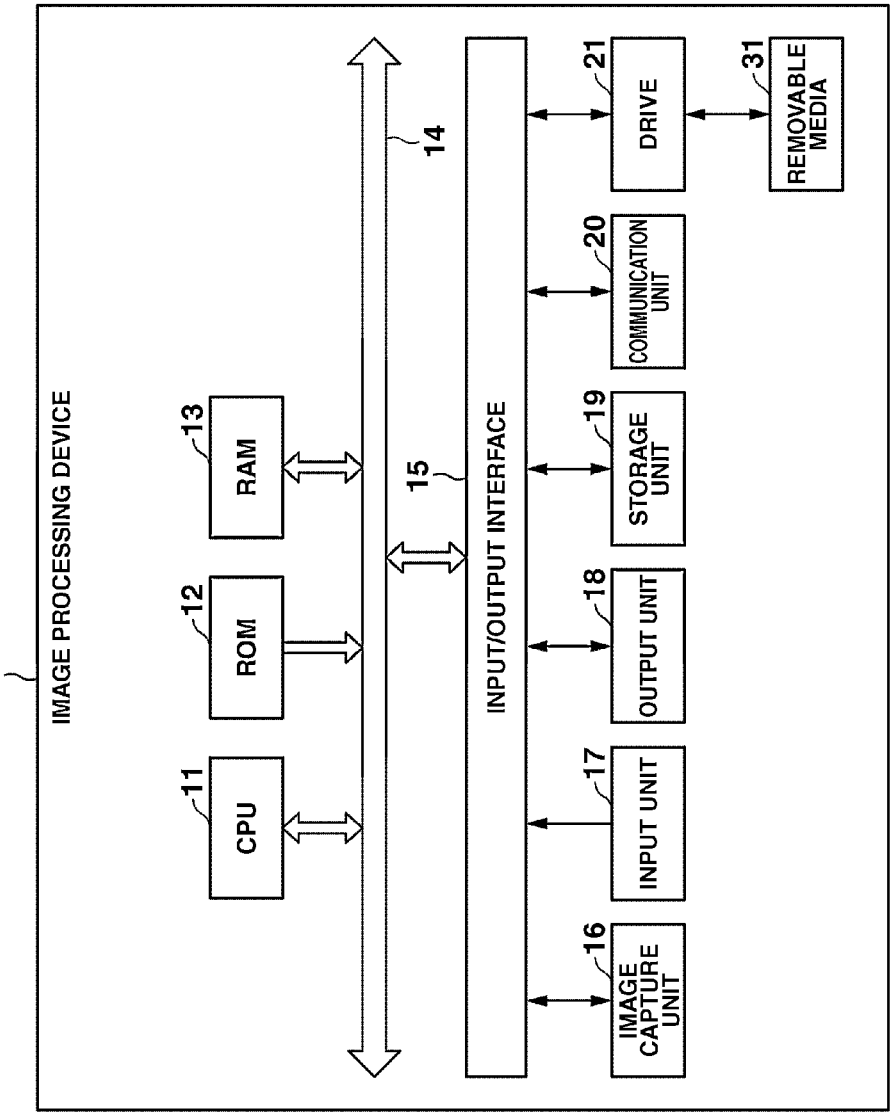

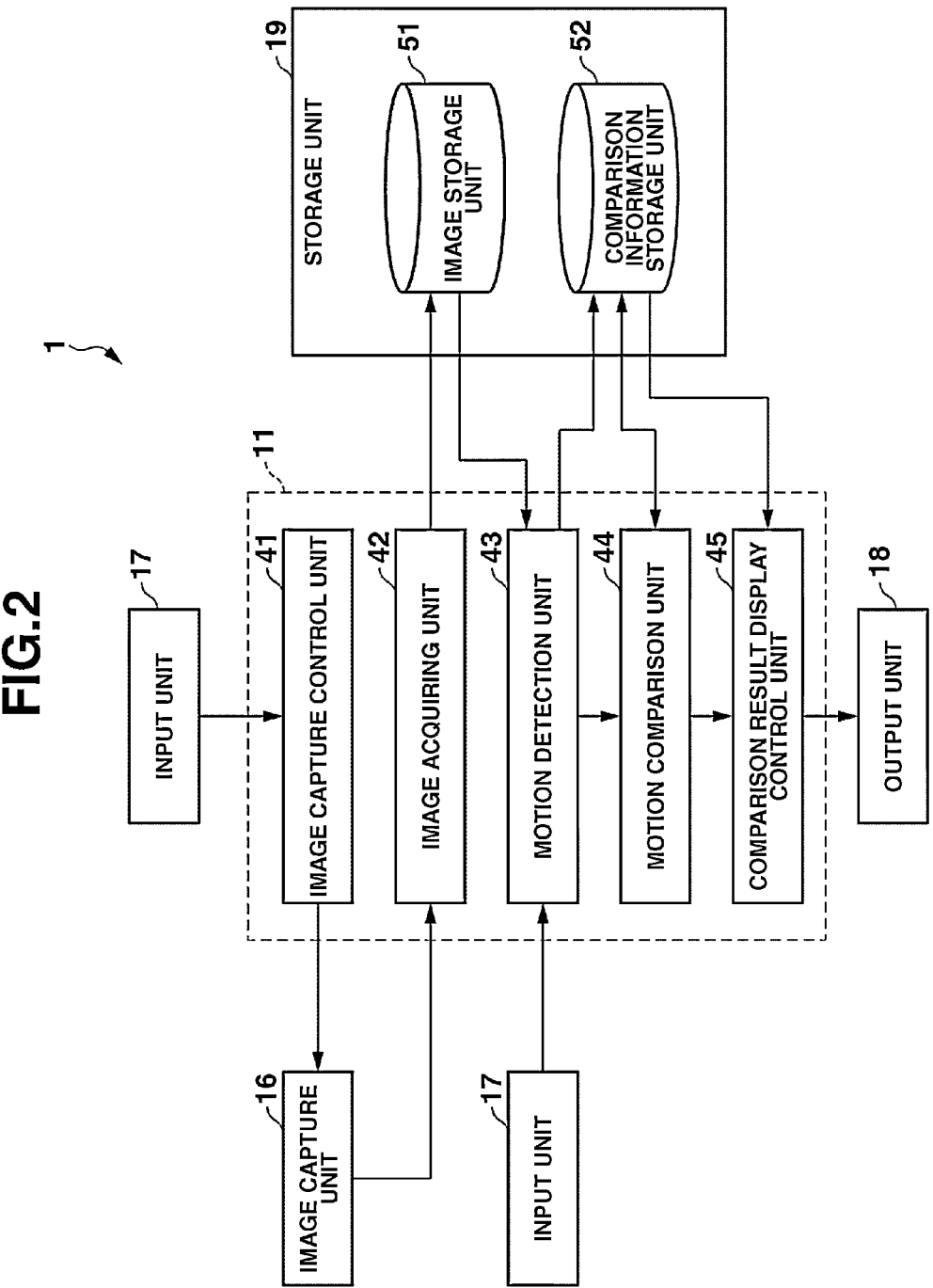

MOTION REFERENCE AXIS (GOLF CLUB)

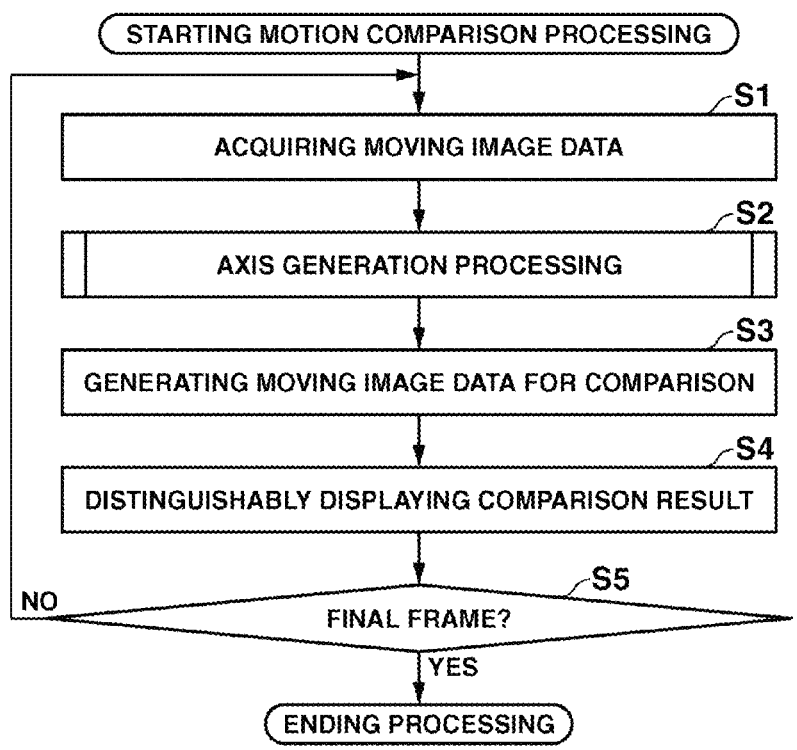
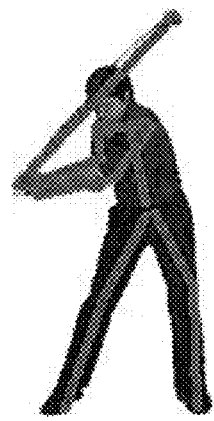
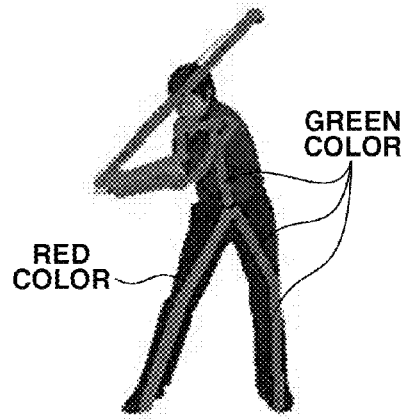

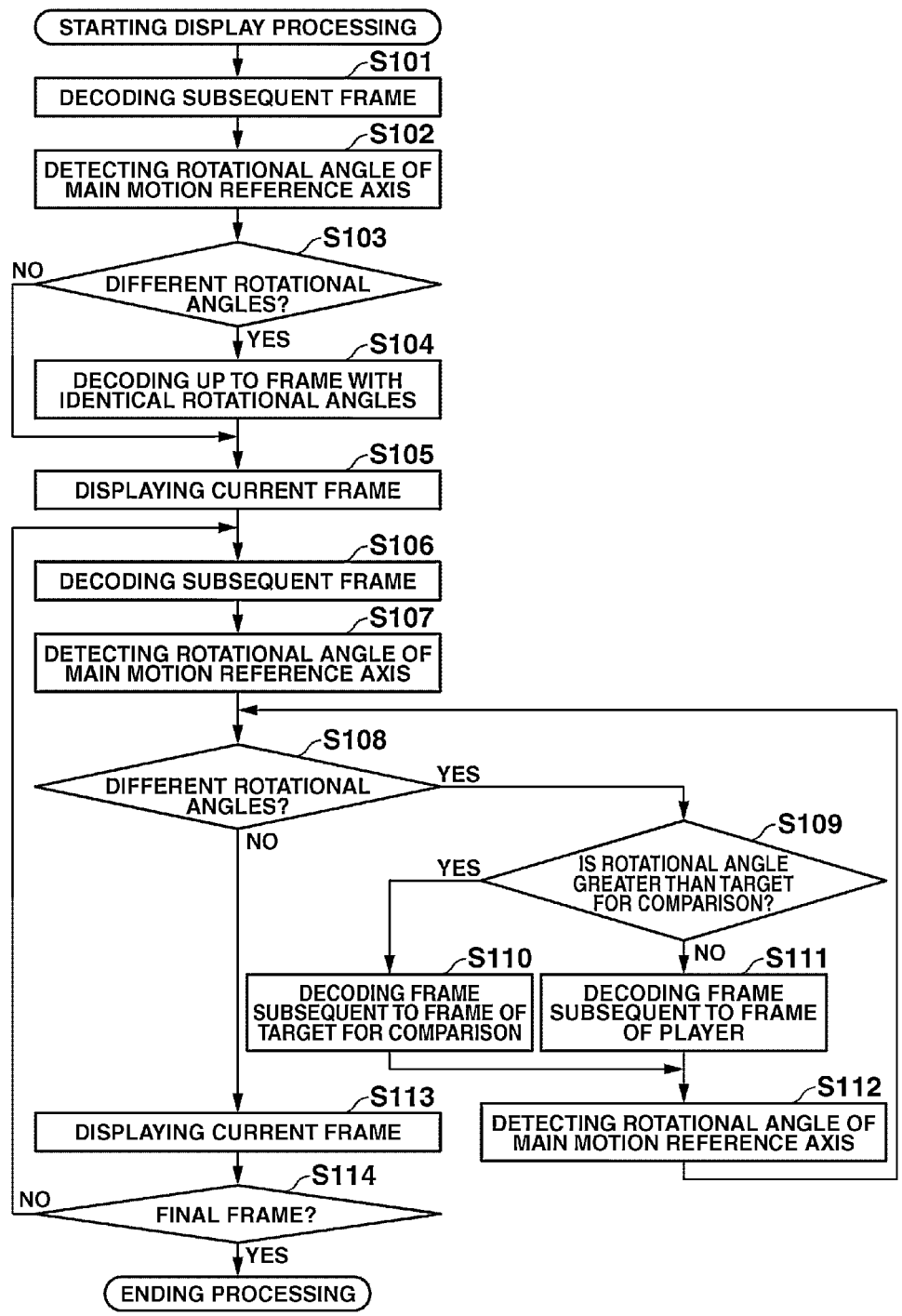

FIG.11

| FRAME NUMBER | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| PLAYER | 180 DEGREES | 181 DEGREES | 182 DEGREES | 183 DEGREES | 184 DEGREES | 185 DEGREES | 186 DEGREES | 187 DEGREES | 188 DEGREES | 189 DEGREES | 190 DEGREES | 191 DEGREES | 192 DEGREES | 193 DEGREES | 194 DEGREES | 195 DEGREES | 196 DEGREES |
| COMPARISON TARGET | 180 DEGREES | 181 DEGREES | 182 DEGREES | 183 DEGREES | 184 DEGREES | 186 DEGREES | 188 DEGREES | 190 DEGREES | 192 DEGREES | 193 DEGREES | 194 DEGREES | 195 DEGREES | 196 DEGREES | 197 DEGREES | 198 DEGREES | 199 DEGREES | 200 DEGREES |

REPLAY DIRECTION

IMAGE PROCESSING DEVICE THAT ANALYZES MOTION OF OBJECT

This application is based on and claims the benefit of priority from Japanese Patent Application No. 2012-064533, filed on 21 Mar. 2012, the content of which is incorporated herein by reference.

BACKGROUND OF THE INVENTION

1. Field of the Invention

The present invention relates to an image processing device that analyzes motion of an object, an image processing method, and a storage medium.

2. Related Art

Conventionally, motion such as a golf swing has been photographed so as to compare it with a moving image of a model motion.

For example, in the picture recording and reproducing device disclosed in Unexamined Japanese Patent Application, Publication No. H10-304299, in two moving images to be compared, a specific reproduction point for each moving image is designated, and the two moving images are reproduced by matching the reproduction points thus designated.

SUMMARY OF THE INVENTION

An image processing device according to one aspect of the present invention includes: an image acquiring unit that acquires a first image in which a motion of an object is captured; a setting unit that sets a first line which is a reference of motion of the object in the first image acquired by the image acquiring unit; a comparing unit that compares the first line that is set by the setting unit with a second line that is a target for comparison with respect to the first line; and a display control unit that displays information corresponding to a comparison result by the comparing unit on a display unit.

Furthermore, an image processing method according to one aspect of the present invention includes: acquiring a first image in which a motion of an object is captured; setting a first line which is a reference of motion of the object in the first image acquired by the image acquiring unit; comparing the first line that is set by the setting unit with a second line that is a target for comparison with respect to the first line; and displaying information corresponding to a comparison result by the comparing unit on a display unit.

A storage medium according to one aspect of the present invention is a storage medium encoded with a computer-readable program that enables a computer to execute functions as: an image acquiring unit that acquires a first image in which a motion of an object is captured; a setting unit that sets a first line which is a reference of motion of the object in the first image acquired by the image acquiring unit; a comparing unit that compares the first line that is set by the setting unit with a second line that is a target for comparison with respect to the first line; and a display control unit that displays information corresponding to a comparison result by the comparing unit on a display unit.

BRIEF DESCRIPTION OF THE DRAWINGS

FIG. 1 is a block diagram showing a hardware configuration of an image processing device according to one embodiment of the present invention;

FIG. 2 is a functional block diagram showing a functional configuration for executing motion comparison processing, from among the functional configurations of the image processing device of FIG. 1;

FIG. 6 is a flowchart showing an example of the flow of motion comparison processing executed by the image processing device of FIG. 1 having the functional configuration of FIG. 2;

FIG. 7A is a diagram showing a display example of a comparison result of a motion;

FIG. 7B is a diagram showing a display example of a comparison result of a motion;

FIG. 10 is a flowchart showing the flow of motion velocity correction display processing executed by the image processing device of FIG. 1 having the functional configuration of FIG. 2;

FIG. 11 is a schematic view showing a state in which moving image data is displayed to be associated with motion information of a motion by the motion velocity correction display processing.

DETAILED DESCRIPTION OF THE INVENTION

Figure 3A:
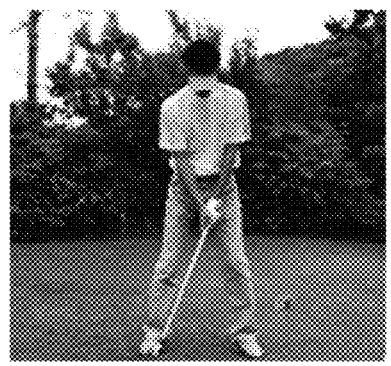
FIG. 3A is a diagram showing a specific example of detecting a motion by setting a motion reference axis in an example of an image of a frame.

In the following, embodiments of the present invention are explained with reference to the drawings.

First Embodiment

Configuration

FIG. 1 is a block diagram showing a hardware configuration of an image processing device according to an embodiment of the present invention.

The image processing device 1 is configured as, for example, a digital camera.

The image processing device 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, the RAM 13, and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

FIG. 2 is a functional block diagram showing a functional configuration for executing motion comparison processing, among the functional configurations of such an image processing device 1.

The motion comparison processing refers to a sequence of processing of comparing the motion of a captured subject with the motion of a target for comparison, and displaying the difference therebetween.

In the present embodiment, an example is explained of comparing a golf swing of a player captured by the image processing device 1 with a golf swing of a professional golfer acquired in advance. However, a variety of motions can be compared such as comparing a recent golf swing with a past golf swing of a player captured by the image processing device 1.

When the motion comparison processing is executed, as shown in FIG. 2, an image capture control unit 41, an image acquiring unit 42, a motion detection unit 43, a motion comparison unit 44, and a comparison result display control unit 45 function in the CPU 11.

However, FIG. 2 is merely an example, and at least a part of the functions of the CPU 11 may be imparted to a hardware that performs image processing such as a GA (Graphics Accelerator).

When the motion comparison processing is executed, an acquired image storage unit 51 and a comparison information storage unit 52 that are provided as one area of the storage unit 19 are used.

In the acquired image storage unit 51, data of a captured image outputted from the image capture unit and acquired by the image acquiring unit 42 is stored.

In the comparison information storage unit 52, moving image data for comparison (described later) outputted from the motion comparison unit 44 are stored. It should be noted that, in the present embodiment, for moving image data of a professional golfer as a target for comparison as well, a motion reference axis(line) described later is set by the motion detection unit 43, and the moving image data is stored in the comparison information storage unit 52 in a state in which the data of the motion reference axis is associated therewith.

The image capture control unit 41 sets various image capture conditions and controls the operation of image capture at the image capture unit 16.

In the present embodiment, in order to capture a sequence of motions of a subject, the image capture control unit 41 causes the image capture unit 16 to capture the subject continuously to output as moving image data.

The image acquiring unit 42 acquires moving image data outputted from the image capture unit 16. Then, the image acquiring unit 42 causes the acquired image storage unit 51 to store the moving image data.

In response to a start instruction for the motion comparison processing inputted via the input unit 17, the motion detection unit 43 refers to the moving image data stored in the acquired image storage unit 51 and detects motion of the subject in the image of each frame constituting the moving image data. More specifically, the motion detection unit 43 performs outline extraction by applying an edge detection filter to the image of each frame constituting the moving image data and performs noise removal processing at the outline thus extracted (an unnecessary outline). In other words, the motion detection unit 43 has an outline extraction function that extracts an outline of the subject. Furthermore, the motion detection unit 43 specifies a closed area indicating a body in the image on which the noise removal processing is performed. In the present embodiment, a model that defines an outline of a body and joint positions (hereinafter referred to as "body model") is stored beforehand and a closed area indicating a body is detected by referring to the outline of this body model. Moreover, the motion detection unit 43 performs an edge point and a bending point in a longitudinal direction of the closed area indicating a body. Then, the motion detection unit 43 refers to the joint positions of the body model based on the edge point and the bending point thus extracted and performs setting of each of the motion reference axes that constitute the axes of the body during motion. In other words, the motion detection unit 43 has an axis setting function that sets a motion reference axis. The motion detection unit 43 detects a motion of a player by tracking this motion reference axis between a plurality of the frames.

Since the edge point and the bending point at the outline can be relatively easily detected, it is possible to easily perform the setting of the motion reference axis using these.

In addition, in a case of detecting the motion of a player for moving image data from a front side during the address, since the motion of the arm that leads the swing (left arm if a right-handed player) is displayed without being hidden at main parts of the swing, an upper portion of the arm that leads a swing is specified as a motion reference axis that is most closely watched in the present embodiment. Hereinafter, the motion reference axis that is set at the upper portion of this left arm is called a "main motion reference axis" as appropriate and other motion reference axes are called "auxiliary motion reference axes" as appropriate.

For the image of each frame constituting moving image data, the motion detection unit 43 outputs data indicating each of the motion reference axes set to be associated with the image of each frame to the motion comparison unit 44.

The motion comparison unit 44 refers to the motion reference axis set by the motion detection unit 43 and compares the motion of a subject between two different moving image data. More specifically, the motion comparison unit 44 compares an angle of a main motion reference axis at each frame among a sequence of motions of the moving image of a player and the moving image of a professional golfer as the target for comparison, and specifies a corresponding motion between the moving images. For example, the motion comparison unit 44 sets a rotational angle in a counterclockwise direction with the upwards direction of the frame as 0 degrees, and specifies a predetermined motion of a swing according to the rotational angle of the main motion reference axis. Then, while the motion comparison unit 44 verifies movement of the primary motion reference axes between moving image data of a player and moving image data of a professional golfer as a target for comparison, the motion comparison unit 44 specifies, as images of corresponding motions, each image of a frame in which the rotational angles of the primary motion reference axes during a sequence of the movements become substantially identical therebetween.

Furthermore, the motion comparison unit 44 compares the images of corresponding motions between the moving image of the player and the moving image of the professional golfer as a target for comparison, and detects a difference in the motions of the subjects based on the positions and the rotational angles of the motion reference axes set in the images. More specifically, the motion comparison unit 44 calculates the difference between the positions and the rotational angles of the motion reference axes in each frame of the moving images of the professional golfer and the player. Then, the motion comparison unit 44 adds data indicating the difference (hereinafter, referred to as "comparison result data" as appropriate) to the moving image data of the player. As comparison result data, for example, a vector and an angle are added which represent how different the travel direction and the rotational angle of the motion reference axis of interest is from the travel direction and the rotational angle of the motion reference axis corresponding to a moving image as a target for comparison.

Then, the motion comparison unit 44 generates the moving image data of the player to which the comparison result data is added (hereinafter, referred to as "moving image data for comparison" as appropriate) and stores the moving image data for comparison in the comparison information storage unit 52.

In this way, the moving image data for comparison becomes moving image data including comparison result data indicating a difference from a moving image of a professional golfer.

When the comparison of the motions by motion comparison unit 44 ends, the comparison result display control unit 45 reads and decodes moving image data for comparison from the comparison information storage unit 52, and superimposes the motion reference axis on the moving image of the player so as to display the moving image data for comparison.

Method for Detecting Motion

Next, a method for detecting motion of the motion detection unit 43 is described in detail.

FIGS. 3A to 3G are views of specific examples of detecting motion by setting motion reference axes in an example of an image of a frame. In addition, the examples of the image of the frame shown in FIGS. 3A to 3G illustrate a state of the subject such as during the address or at the time of impact when a golf club is positioned relatively close to a tee peg.

The motion detection unit 43 initially performs edge detection processing using an edge detection filter on the image of the frame illustrated in FIG. 3A. In this way, as illustrated in FIG. 3B, outlines of an image in an entire frame including the outline of the subject is detected.

Figure 3B:
FIG. 3B is a diagram showing a specific example of detecting a motion by setting a motion reference axis in an example of an image of a frame.
Figure 3C:
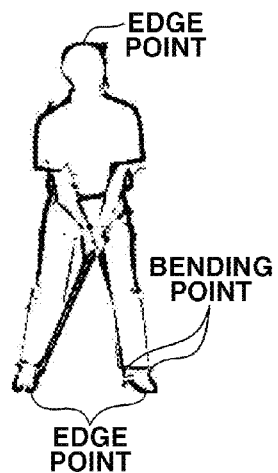
FIG. 3C is a diagram showing a specific example of detecting a motion by setting a motion reference axis in an example of an image of a frame.

Next, the motion detection unit 43 removes, as noise, the outlines floating and outlines departing from the center portion of a frame on the image of the frame after the edge detection illustrated in FIG. 3B, and specifies a portion that is set to be a closed area as an outline of the subject (the player). In this way, as illustrated in FIG. 3C, the outline of the subject (the player) developed at the center portion of the frame is extracted. Regarding an outline of a player as a subject, since its typical shape can be modeled, a model of an outline of a body may be provided beforehand. By checking an outline of a subject with a model of an outline of a body provided beforehand, it becomes possible to specify the outline of the subject more accurately.

Next, the motion detection unit 43 extracts an edge point in a longitudinal direction and a bending point of a closed area indicating an outline of the subject on the image of the frame illustrated in FIG. 3C, and sets a motion reference axis for each part of the body with reference to joint positions of a body model. In other words, the motion detection unit 43 traces an outline from the edge point in the longitudinal direction to the inner side of the area in the closed area indicating the outline of the subject and extracts, as a bending point, a portion in which the outline is bent. For the case of an outline of a player's body, a bending point appears in the form of a pair in a horizontal direction of a frame (for example, an inner side and an outer side of an ankle, an inner side and an outer side of a knee, a left side and a right side of a hip, and the like). Therefore, the motion detection unit 43 sets each of the motion reference axes by coupling a central portion between a pair of the bending points with the edge point in the longitudinal direction as an origin to establish a joint position of the body model. In addition, the motion reference axis is also set for any body part that can indicate a motion, in addition to the axes coupling the edge point and the joint. For example, a motion reference axis is set which couples left and right bending points of the hip in order to show a rotation of the hip, and a motion reference axis is set which couples the neck and the center of the motion reference axis coupling a left and right bending points of the hip in order to show an inclination of an upper body.

Figure 3D:
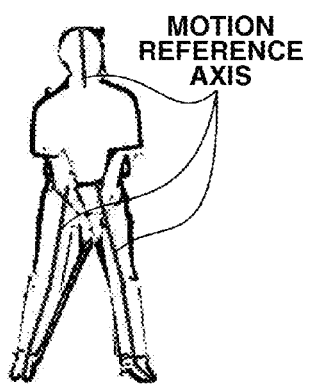
FIG. 3D is a diagram showing a specific example of detecting a motion by setting a motion reference axis in an example of an image of a frame.

More specifically, the motion detection unit 43 respectively sets, on the image of the frame illustrated in FIG. 3C, motion reference axes from the edge point located at the toe of the subject to an intermediate point of the bending points located at the ankle, from the intermediate point of the bending points located at the ankle to an intermediate point of the bending points located at the knee, from a left part of the hip to a right part of the hip, from the intermediate point of the bending points located at the knee to the axis that couples the left and right parts of the hip, and from the edge point located at the top of the head to the intermediate point of the bending points located at the neck. In this way, as illustrated in FIG. 3D, the motion reference axes for a head portion and a lower body are set.

Next, the motion detection unit 43 respectively sets, on the image of the frame illustrated in FIG. 3C, the motion reference axes from a hand of the subject (a bending point of holding a golf club) to an intermediate point of a bending point located at a wrist, from the intermediate point of the bending point located at the wrist to an intermediate point of a bending point located at an elbow, and from the intermediate point of the bending point located at the elbow to an intermediate point of a bending point located at a shoulder.

Figure 3E:
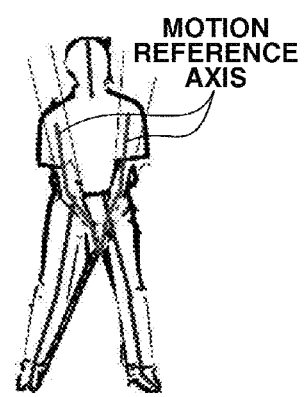
FIG. 3E is a diagram showing a specific example of detecting a motion by setting a motion reference axis in an example of an image of a frame.

In this way, as illustrated in FIG. 3E, the motion reference axes from the shoulder to the end of the arm are set.

Figure 3F:
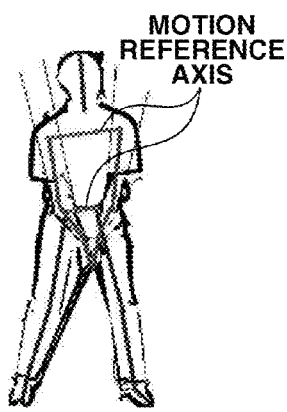
FIG. 3F is a diagram showing a specific example of detecting a motion by setting a motion reference axis in an example of an image of a frame.

Next, the motion detection unit 43 respectively sets the motion reference axes from a left shoulder to a right shoulder of the subject (joint positions of the left and right shoulders defined based on the bending portions of the left and right shoulder portions) and from a left part to a right part of the hip (a reference position of the hip defined based on the bending points of the left and right portions of the hip). In this way, as illustrated in FIG. 3F, the motion reference axes of the upper body in a horizontal direction are set.

Figure 3G:
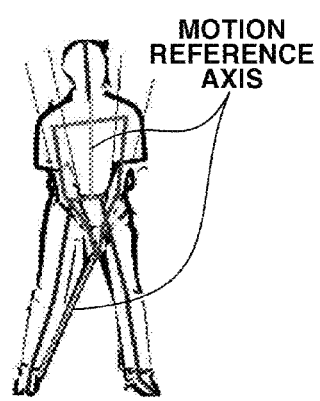
FIG. 3G is a diagram showing a specific example of detecting a motion by setting a motion reference axis in an example of an image of a frame.
Figure 4A:
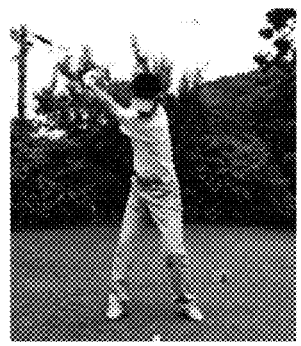
FIG. 4A is a diagram showing a specific example of detecting a motion by setting a motion reference axis in another example of an image of a frame.
Figure 4B:
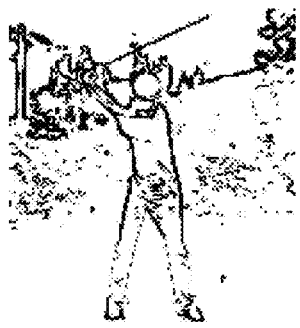
FIG. 4B is a diagram showing a specific example of detecting a motion by setting a motion reference axis in another example of an image of a frame.
Figure 4C:
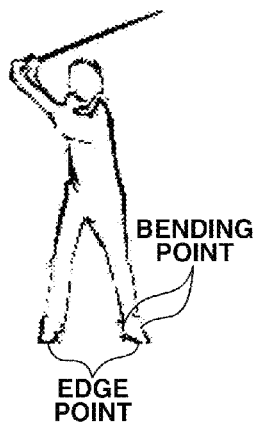
FIG. 4C is a diagram showing a specific example of detecting a motion by setting a motion reference axis in another example of an image of a frame.
Figure 4D:
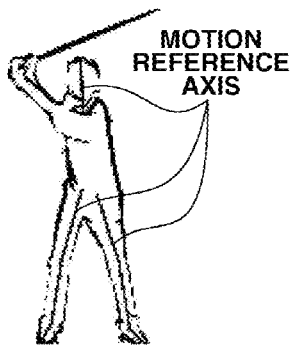
FIG. 4D is a diagram showing a specific example of detecting a motion by setting a motion reference axis in another example of an image of a frame.
Figure 4E:
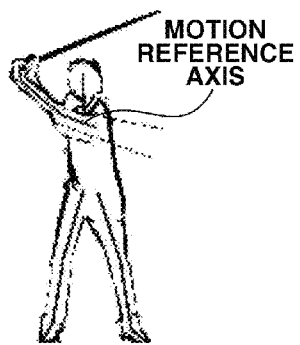
FIG. 4E is a diagram showing a specific example of detecting a motion by setting a motion reference axis in another example of an image of a frame.
Figure 4F:
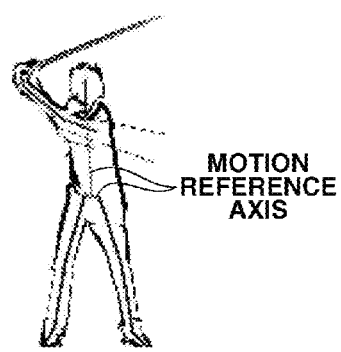
FIG. 4F is a diagram showing a specific example of detecting a motion by setting a motion reference axis in another example of an image of a frame.

Furthermore, the motion detection unit 43 sets the motion reference axis from an intermediate point of the bending points located at the neck of the subject to an intermediate point of an axis coupling the left and right portions of the hip. In this way, as illustrated in FIG. 3G, the motion reference axes indicating the rotational axes of the upper body are set.

Furthermore, FIGS. 4A to 4F are views of specific examples of detecting motion by setting motion reference axes in another example of an image of a frame. In addition, the examples of the images of the frames shown in FIGS. 4A to 4F illustrate a state of a subject when a golf club is in a higher position than the player's head, for example, at the time of the golf club being positioned immediately before the top after the back swing.

For the cases of FIGS. 4A to 4F as well, the motion detection unit 43 extracts the edge point in the longitudinal direction and the bending point of a closed area indicating an outline of the subject and sets motion reference axes for each of body parts, similarly to the cases illustrated in FIGS. 3A to 3G. Furthermore, since the states illustrated in FIGS. 4A to 4F are states of the right arm being hidden and its outline cannot specified, the motion detection unit 43 does not set a motion reference axis related to the right arm. On the other hand, when the right arm appears again and its outline can be specified, the motion detection unit 43 sets a motion reference axis again.

Here, since the golf club held by the player is a linear stick-shaped member, and thus it is easily distinguish it from the player's body, a unique motion reference axis is set to the golf club.

However, since the golf club may be hidden behind a user, the motion detection unit 43 recognizes the linear stick-shape member as the golf club.

Figure 5A:
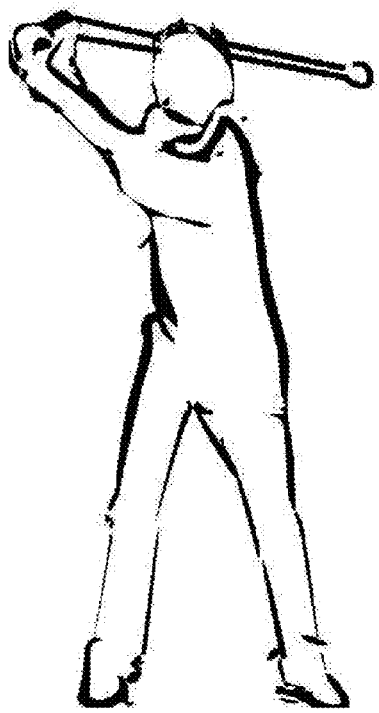
FIG. 5A is a diagram showing a specific example of setting a motion reference axis of a golf club.
Figure 5B:
FIG. 5B is a diagram showing a specific example of setting a motion reference axis of a golf club.

FIGS. 5A and 5B are views of specific examples of setting a motion reference axis of a golf club. It should be noted that the examples of images of frames illustrated in FIGS. 5A and 5B show a state in which the golf club is hidden behind the head portion of the player at the time of the top after the back swing.

In the cases illustrated in FIGS. 5A and 5B, the outline of the golf club appears at the left and right sides of the head portion of the player separately. However, the motion detection unit 43 couples the separated outlines at the left and right sides of the head portion of the player to establish the outline of the hidden part of the golf club, thereby setting the motion reference axis.

Motion

Next, motions are explained below.

Motion Comparison Processing

Initially, motion comparison processing (main flow) executed by the image processing device 1 is explained.

FIG. 6 is a flow chart showing an example of the flow of motion comparison processing executed by the image processing device 1 of FIG. 1 having the functional configuration of FIG. 2.

The motion comparison processing starts in response to an execution instruction for the motion comparison processing being input by the user through the input unit 17.

In FIG. 6, when the motion comparison processing starts, the motion detection unit 43 acquires moving image data from the acquired image storage unit 51 to decode and stores decoded data of a frame in a buffer area of the RAM 13 in Step S1.

In Step S2, the motion detection unit 43 detects the motion of a subject in the decoded image of the frame by executing axis generation processing as described later.

In Step S3, the motion comparison unit 44 refers to the motion reference axes set by the motion detection unit 43, compares a moving image of a player with the motion of a subject in moving image data as a target for comparison, and generates moving image data for comparison to which comparison result data is added. It should be noted that the moving image data for comparison is stored in the comparison information storage unit 52.

In Step S4, the comparison result display control unit 45 reads moving image data for comparison stored in the comparison information storage unit 52 and displays a moving image of the player while distinguishing the difference from the motion reference axis of the moving image data as a target for comparison. At this time, the comparison result display control unit 45 distinguishably displays, in a different color, a portion that is different from the motion reference axis on the moving image data as a target for comparison, on each of the motion reference axes of the moving image of the player.

FIGS. 7A and 7B are views illustrating display examples of a comparison result of motion. In addition, FIG. 7A illustrates one frame of moving image data of a professional golfer as a target for comparison and FIG. 7B illustrates one frame of moving image data of a player.

In the examples of FIGS. 7A and 7B, the movement of the right thigh of the player is in a state open relative to the movement of the right thigh of the professional golfer as a target for comparison (a state of great outward deviation). Therefore, in FIGS. 7A and 7B, the motion reference axis set to the right thigh on the moving image of the player is displayed in a special color (for example, red) to alert caution, and thus is displayed to be distinguished from another color of the motion reference axis (for example, green). In this way, it is possible to distinguishably display a portion in the motion that is different between the player and the professional golfer clearly.

In Step S5, the comparison result display control unit 45 determines whether the moving image data for comparison has been set to be a final frame.

In a case in which the moving image data for comparison has not been set to be a final frame, a NO determination is made in Step S5 and the processing advances to Step S1.

On the other hand, in a case in which the moving image data for comparison has been set to be a final frame, a YES determination is made in Step S5 and the motion comparison processing ends.

Axis Generation Processing

Next, axis generation processing executed in Step S2 of the motion comparison processing is explained.

Figure 8:
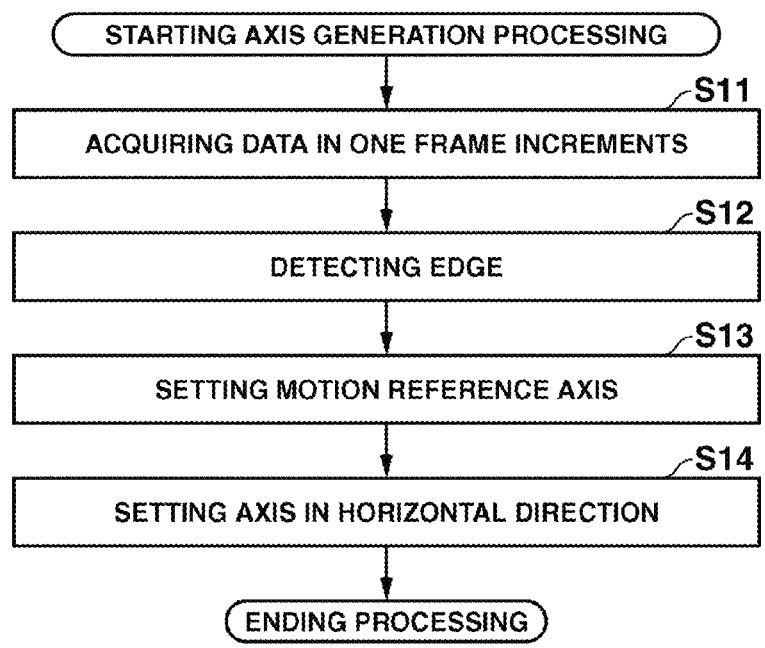
FIG. 8 is a flowchart showing an example of the flow of axis generation processing executed by the image processing device of FIG. 1 having the functional configuration of FIG. 2.

FIG. 8 is a flowchart showing an example of the flow of the axis generation processing executed by the image processing device 1 of FIG. 1 having the functional configuration of FIG. 2.

When the axis generation processing starts, the motion detection unit 43 reads decoded data of a frame stored in the buffer area of the RAM 13 in one frame increments in Step S11.

In Step S12, the motion detection unit 43 applies an edge detection filter to the image of the frame. At this time, noise such as outlines on a background among the outlines extracted by the edge detection filter is removed.

In Step S13, for the outlines extracted by the edge detection filter, the motion detection unit 43 refers to a body model and detects a closed area indicating a body, and sets a motion reference axis based on an edge point in a longitudinal direction and a bending point therein.

In Step S14, the motion detection unit 43 sets an axis that couples a left part and a right part of a hip and an axis that couples a left shoulder and a right shoulder (axes in a horizontal direction) among the motion reference axes. After the processing of Step S14, the processing returns to Step S3 of the motion comparison processing.

As described above, in the image processing device 1 according the present embodiment, the image acquiring unit 42 acquires a group of images of a player of which the motion of an object is captured and a group of images of a professional golfer as a target for comparison of which a motion of an object is captured. The motion detection unit 43 having an axis setting function sets motion reference axes on the moving image of the player and the moving image of the professional golfer. Then, the motion comparison unit 44 compares the moving image of the player with the moving image of the professional golfer as a target for comparison, based on the motion reference axes. Furthermore, the comparison result display control unit 45 performs control for displaying the difference between the moving image of the player and the moving image of the professional golfer based on a comparison result from the motion comparison unit 44.

Therefore, it is possible to accurately perform the comparison between moving image of the player and the moving image of the professional golfer based on the difference between the motions of the motion reference axes, and thus the difference between the motions can be detected clearly.

Therefore, since it is possible to display the difference between the moving image of the player and the moving image as a target for comparison in an easily recognizable manner, it is possible to recognize the difference between the motions to be compared more easily.

Furthermore, the motion detection unit 43 having the axis setting function respectively sets a motion reference axis to at least one portion of a player and a professional golfer, and the motion comparison unit 44 compares the difference of the motions between the player and the professional golfer based on the motion reference axis set by the motion detection unit 43.

Therefore, it is possible to clearly detect motions of different objects based on the difference between motions of the motion reference axes.

Furthermore, the motion detection unit 43 extracts outlines of objects using an outline extracting function and sets motion reference axes based on edge points and bending points of the outlines extracted by the axis setting function.

Therefore, it becomes possible to accurately set motion reference axes on images of objects and compare the movements of the objects.

Furthermore, the comparison result display control unit 45 distinguishably displays at least either one of the motion reference axes that are respectively set when the movements of the player and the professional golfer are different from each other.

Therefore, it is possible to recognize the difference of the motions between the player and the professional golfer more easily.

Furthermore, the comparison result display control unit 45 displays the motion reference axis by superimposing the motion reference axis on the moving image of the player.

Therefore, it is possible to recognize the movement of the player more easily.

In addition, although the motion detection unit 43 refers to a body model to extract an outline indicating a body of an object and to set each joint position in the present embodiment, it is also possible to analyze an outline detected and set an outline indicating a body of an object and each joint position, without referring to a body model. In this case, it may be configured to set the motion reference axis with the edge point of the closed area of the outline indicating a body as an origin point and to set only a motion reference axis that can be set reliably based on the outline. Furthermore, the joint position may be configured to be set at a location that can be easily defined such as an intermediate point of the bending points on the outline, an intersection of the outline, the motion reference axis, etc.

Modified Example

In the first embodiment, a case of distinguishably displaying the difference between the motion reference axes the moving image of the player and the moving image as a target for comparison in different colors is explained.

On the other hand, in addition to or in place of color, it is also possible to display the direction and the magnitude of the difference between the motions of the motion reference axes of the moving image of the player and the moving image as a target for comparison by superimposing an indicator such as an arrow and the like.

Figure 9A:
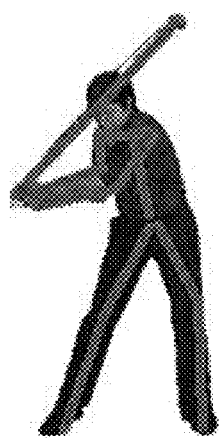
FIG. 9A is a diagram showing a comparison result example of a motion in a modified example.
Figure 9B:
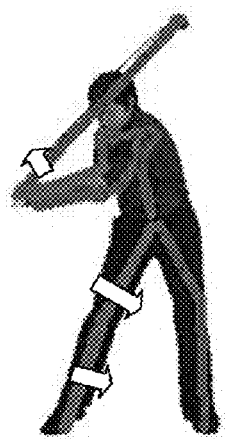
FIG. 9B is a diagram showing a comparison result example of a motion in a modified example.

FIGS. 9A and 9B are views showing an example of a comparison result of a motion in the modified example.

In FIGS. 9A and 9B, it is shown by arrows that the player's right leg in the motion moves inward and the arm moves toward the direction of a back swing relative to the motion of the professional golfer. These arrows are displayed with in a size corresponding to the magnitude of the difference between the motion of the player and the motion of the professional player as a target for comparison.

As shown in FIGS. 9A and 9B, since the comparison result display control unit 45 shows comparison result data that is associated with a motion reference axis as an arrow (indicator indicating the direction and the magnitude of difference of motions), it is possible to display in which direction the motion of the player differs relative to the motion of the professional golfer in a manner such that the difference therebetween can be easily recognized.

Second Embodiment

Next, a second embodiment of the present invention is explained.

In the first embodiment, a case of distinguishably displaying by comparing the motion of the motion reference axis of the body in the moving image of the player with the motion of the motion reference axis of the body on the moving image of the professional golfer as a target for comparison by replaying the moving image data for comparison is explained.

On the other hand, in the present embodiment, moving image data for comparison and moving image data of a professional golfer are replayed arranged side-by-side. Then, even if there is a difference in swing velocity between the motion of the player and the motion of the professional golfer, the data of these moving images will be displayed in a manner such that the information of these motions corresponds to each other.

In this case as well, the aspect of the edge detection filter being applied to the data of each frame in the moving image data so as to set a motion reference axis and generate data for comparison is the same as the first aspect.

In other words, the hardware configurations and the functional configurations of the image processing apparatus 1 according to the present embodiment are similar to those in FIGS. 1 and 2 according to the first embodiment. Therefore, the flow of processing to correct and display the difference in velocity of a motion, which is a part different from the first embodiment, is explained while referencing these figures.

FIG. 10 is a flowchart showing the flow of motion velocity correction display processing executed by the image processing device 1 of FIG. 1 having the functional configurations of FIG. 2. Furthermore, FIG. 11 is a schematic view showing a state in which moving image data is displayed to be associated with information of motion by the motion velocity correction display processing. It should be noted that an angle indicated within the frame of FIG. 11 represents a rotational angle of a main motion reference axis.

The motion velocity correction display processing starts in response to an execution instruction for the motion velocity correction display processing being inputted by the user through the input unit 17.

In FIG. 10, when the motion velocity correction display processing starts, in Step S101, the comparison result display control unit 45 reads moving image data for comparison as well as moving image data of a professional golfer as a target for comparison from the comparison result display control unit 45 and decodes a head frame.

In Step S102, the comparison result display control unit 45 detects a rotational angle of a main motion reference axis in each of the frames thus decoded.

In Step S103, the comparison result display control unit 45 determines whether a rotational angle of the main motion reference axis is different in the decoded frame of the moving image data for comparison as well as the moving image data of the professional golfer as a target for comparison.

In a case of the rotational angle of the main motion reference axis not being different in the decoded frame of the moving image data for comparison as well as the moving image data of the professional golfer as a target for comparison, it is judged as NO in Step S103 and the processing advances to Step S105. In a head frame of FIG. 11, since the rotational angle of each frame matches, it is judged as NO in Step S103.

On the other hand, in a case of the rotational angle of the main motion reference axis being different in the decoded frame of the moving image data for comparison as well as the moving image data of the professional golfer as a target for comparison, it is judged as YES in Step S103 and the processing advances to Step S104.

In Step S104, the comparison result display control unit 45 sequentially acquires frames of moving image data in which a back swing is delayed (i.e. moving image data in which a rotational angle of the main motion reference axis is wider) and decodes up to a frame with a rotational angle that is identical to a rotational angle of the main motion reference axis in data of the other moving image.

In Step S105, the comparison result display control unit 45 displays a current frame of the moving image data for comparison and the moving image data of the professional golfer as a target for comparison.

In Step S106, the comparison result display control unit 45 decodes a subsequent frame in each of the moving image data for comparison and the moving image data of the professional golfer as a target for comparison.

In Step S107, the comparison result display control unit 45 detects a rotational angle of the main motion reference axis in each of the frames thus decoded.

In Step S108, the comparison result display control unit 45 determines whether the rotational angle of the main motion reference axis is different between the decoded frame of the moving image data for comparison and the moving image data of the professional golfer as a target for comparison.

In a case of the rotational angle of the main motion reference axis not being different in the decoded frame of the moving image data for comparison as well as the moving image data of the professional golfer as a target for comparison, it is judged as NO in Step S108 and the processing advances to Step S113. In the example shown in FIG. 11, since rotational angles of the main motion reference axis in each frame are not different from each other until the frame with the frame number 6, it is judged as NO in Step S108.

On the other hand, in a case of the rotational angle of the main motion reference axis being different in the decoded frame of the moving image data for comparison as well as the moving image data of the professional golfer as a target for comparison, it is judged as YES in Step S108 and the processing advances to Step S109.

In Step S109, the comparison result display control unit 45 determines whether the velocity of the rotational angle of the main motion reference axis is greater in the moving image data of the player than in the moving image data of the professional golfer as a target for comparison (i.e. the difference in the rotational angle of the main motion reference axis between the previous frame and the current frame is greater).

In a case in which the angular velocity of the main motion reference axis is greater in the moving image data of the player than in the moving image data of the professional golfer as a target for comparison, it is judged as YES in Step S109 and the processing advances to Step S110.

On the other hand, in a case in which the velocity of the rotational angle of the main motion reference axis is not greater in the moving image data of the player than in the moving image data of the professional golfer as a target for comparison, it is judged as NO in Step S109 and the processing advances to Step S111. In the example shown in FIG. 11, the rotational angle of the main motion reference axis is greater in the moving image data of the professional golfer; therefore, it is judged as NO in Step S109.

In Step S110, the comparison result display control unit 45 decodes a subsequent frame of the moving image data of the professional golfer as a target for comparison.

In Step S111, the comparison result display control unit 45 decodes a subsequent frame of the moving image data of the player.

By the processing of Steps S110 and S111, as shown in FIG. 11, frames in the moving image data in which the swing velocity is slower are thinned out.

In Step S112, the comparison result display control unit 45 detects a rotational angle of the main motion reference axis in each frame thus decoded.

After Step S112, the processing advances to Step S108.

In Step S113, the comparison result display control unit 45 displays a current frame of the moving image data for comparison and the moving image data of the professional golfer as a target for comparison.

In Step S114, the comparison result display control unit 45 determines whether it is a final frame in either the moving image data for comparison or the moving image data of the professional golfer as a target for comparison.

In a case in which it is not a final frame in either the moving image data for comparison or the moving image data of the professional golfer as a target for comparison, it is judged as NO in Step S114 and the processing advances to Step S106.

In a case in which it is a final frame in either the moving image data for comparison or the moving image data of the professional golfer as a target for comparison, it is judged as YES in Step S114 and the motion velocity correction display processing ends.

As described above, in the image processing device 1 according to the present embodiment, the comparison result display control unit 45 replays by arranging moving image data for comparison and moving image data of a professional golfer as a target for comparison side-by-side, and in a case of there being a difference in swing velocity of subjects, frames in the moving image data of which the swing velocity is slower are thinned out so as to correct the difference in velocity thereof.

Therefore, information of the motion of a subject to be replayed in the data for comparison and the moving image data of the professional golfer as a target for comparison is set in a state corresponding to each other.

Therefore, since it is possible to display the difference between the moving image of the player and the moving image as a target for comparison in an easily recognizable manner, it is possible to recognize the difference between the motions to be compared more easily.

In addition, it should be noted that, in a case of displaying the moving image data for comparison and the moving image data of the professional golfer in the present embodiment, as shown in the first embodiment, the motion reference axis that is set in each frame may be displayed to be superimposed on an object.

Third Embodiment

Next, a third embodiment of the present invention is explained.

In the second embodiment, moving image data for comparison and moving image data of a professional golfer are replayed to be arranged side-by-side. Then, if there would be a difference of a swing velocity between the motion of the player and the motion of the professional golfer, frames in the moving image data of which the swing velocity is slower are thinned out.

On the other hand, in the present embodiment, if there is a difference of a swing velocity between the motion of the player and the motion of the professional golfer, the moving image data in which the motion is slower is replayed as usual and, in the moving image data of which the motion is faster, frames are interpolated by repetitively displaying identical frames so as to display the moving image data in a state such that the motion of the player corresponds to the motion of the professional golfer.

In this case as well, the third embodiment is similar to the first embodiment in that the edge detection filter is applied to the data of each of the frames of the moving image data so as to set a motion reference axis and generate data for comparison.

In other words, the hardware configurations and the functional configurations of the image processing apparatus 1 according to the present embodiment are similar to those in FIGS. 1 and 2 according to the first embodiment. Therefore, the flow of processing of distinguishably displaying a comparison result of a motion, which is a part different from the first embodiment, is explained hereinafter.

Figure 12:
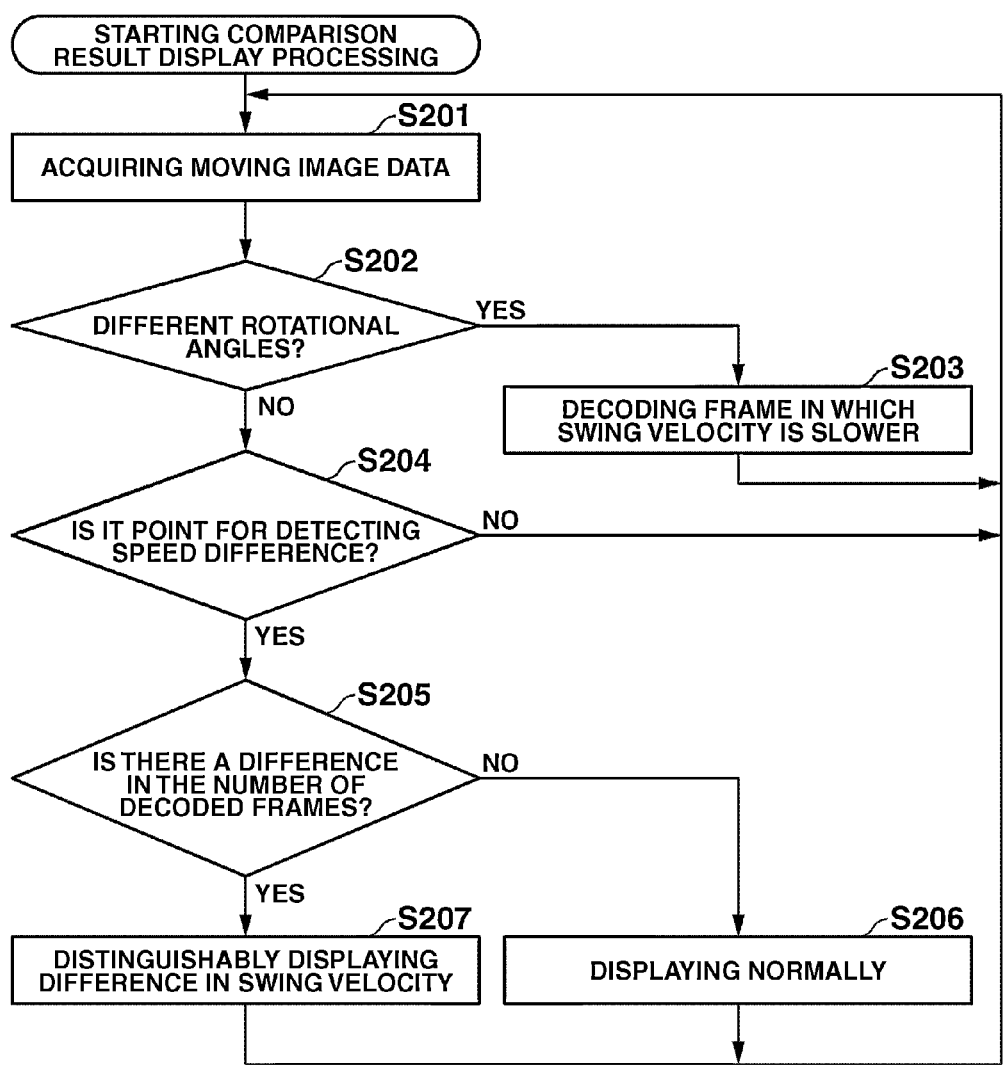
FIG. 12 is a flowchart showing the flow of comparison result display processing executed by the image processing device of FIG. 1 having the functional configurations of FIG. 2.

FIG. 12 is a flowchart showing the flow of comparison result display processing executed by the image processing device 1 of FIG. 1 having the functional configurations of FIG. 2.

The comparison result display processing starts in response to an execution instruction for the comparison result display processing being inputted by the user through the input unit 17.

In FIG. 12, when the comparison result display processing starts, in Step S201, the comparison result display control unit 45 acquires and decodes moving image data for comparison and moving image data of a professional golfer as a target for comparison, and stores the decoded data of frames in a buffer area of the RAM 13.

In Step S202, the comparison result display control unit 45 determines whether a rotational angle of the main motion reference axis is different in the decoded frame of the moving image data for comparison as well as the moving image data of the professional golfer as a target for comparison.

In a case of the rotational angle of the main motion reference axis not being different in the decoded frame of the moving image data for comparison as well as the moving image data of the professional golfer as a target for comparison, it is judged as NO in Step S202 and the processing advances to Step S204.

On the other hand, in a case of the rotational angle of the main motion reference axis being different in the decoded frame of the moving image data for comparison as well as the moving image data of the professional golfer as a target for comparison, it is judged as YES in Step S202 and the processing advances to Step S203.

In Step S203, the comparison result display control unit 45 decodes a subsequent frame of the moving image data of which the motion is slower and stores decoded data of the frame in the buffer area of the RAM 13.

After Step S203, the processing advances to Step S201.

In Step S204, the comparison result display control unit 45 determines whether it is set to be a frame number of a point at which to detect a difference in motion velocity. The frame number of a point at which to detect a difference in motion velocity is set in advance for every predetermined frame number in the moving image data of a professional golfer as a target for comparison.

In a case in which it is not set to be a frame number of a point at which to detect a difference in motion velocity, it is judged as NO in Step S204 and the processing advances to Step S201.

On the other hand, in a case in which it is set to be a frame number of a point at which to detect a difference in motion velocity, it is judged as YES in Step S204 and the processing advances to Step S205.

In Step S205, the comparison result display control unit 45 determines whether there is a difference in the number of decoded frames between the moving image data for comparison and the moving image data of the professional golfer as a target for comparison.

In a case in which there is no difference in the number of decoded frames between the moving image data for comparison and the moving image data of the professional golfer as a target for comparison, it is judged as NO in Step S205 and the processing advances to Step S206.

On the other hand, in a case in which there is a difference in the number of decoded frames between the moving image data for comparison and the moving image data of the professional golfer as a target for comparison, it is judged as YES in Step S205 and the processing advances to Step S207.

In Step S206, the comparison result display control unit 45 acquires data of a frame that is stored in the buffer area of the RAM 13 and displays a moving image without displaying to be distinguishable.

In Step S207, the comparison result display control unit 45 acquires the data of the frame stored in the buffer area of the RAM 13 and displays the moving image by distinguishably displaying that there is a difference in swing velocity between the moving image data for comparison and the moving image data of the professional golfer as a target for comparison. At this time, while the comparison result display control unit 45 displays images of identical frames a plurality of times for moving image data of which the swing velocity is faster, it displays an image of a frame in which the motion corresponds with a frame of moving image data in which the swing velocity is slower.

In this way, for the moving image data in which the swing velocity is faster, frames are interpolated by repetitively displaying identical frames, during which the moving image data in which the swing velocity is slower is displayed so as to catch up with and correspond to the data of which the swing velocity is faster. Then, when in this state, the fact that there is a difference in swing velocity is distinguishably displayed, for example, by way of displaying a frame border surrounding the frame. Therefore, motion in frame images having a difference in swing velocity can be displayed in an easily recognizable manner.

After Step S207, the processing advances to Step S201.

As described above, in the image processing device 1 according to the present embodiment, the comparison result display control unit 45 replays moving image data for comparison and moving image data of a professional golfer to be arranged side-by-side. Then, if there is a difference in swing velocity between the motion of the player and the motion of the professional golfer, the moving image data in which the motion is slower is replayed as usual and, in the moving image data in which the motion is faster, identical frames are repetitively displayed (displayed by interpolating). Then, in a state in which identical frames are repetitively displayed, the fact that there is a difference in swing velocity is distinguishably displayed, for example, by way of displaying a frame border surrounding the frame.

Therefore, moving image data is displayed in a state such that a motion of a player corresponds to a motion of a professional golfer, and a motion in frame images having a difference in swing velocity can be displayed in an easily recognizable manner.

Therefore, since the difference between a moving image as a target for comparison and a moving image of a player can be displayed in an easily recognizable manner, it becomes possible to easily recognize the difference in a motion of an object in a plurality of images.

In addition, in a case of displaying moving image data for comparison and moving image data of a professional golfer, as shown in the first embodiment, a motion reference axis set in each frame may be displayed by superimposing on an object.

It should be noted that the present invention is not to be limited to the aforementioned embodiment, and that modifications, improvements, etc. within a scope that can achieve the object of the present invention are also included in the present invention.

Furthermore, although the moving image data of the professional golfer as a target for comparison is stored in the comparison information storage unit 52 in a state in which the data of the motion reference axis is added in the abovementioned embodiments, the present invention is not limited thereto. In other words, the comparison information storage unit 52 may be configured to store only the data of the motion reference axis as a target for comparison.

In this way, even simply comparing the motion reference axis in the motion of the captured object with the data of the motion reference axis stored in the comparison information storage unit 52 can exert an effect.

Furthermore, although cases in which the present invention is applied are explained by providing examples with moving image data in which a golf swing is photographed as a target in the embodiments described above, the present invention can be applied to comparison between a variety of motions. For example, it is possible to apply to cases of comparing motions such as a swing of a baseball bat, a swing of a tennis racket, dance, etc.

In the aforementioned embodiments, the digital camera has been described as an example of the image processing device 1 to which the present invention is applied, but the present invention is not limited thereto in particular.

For example, the present invention can be applied to any electronic device in general having a condition presentation processing function. More specifically, for example, the present invention can be applied to a lap-top personal computer, a printer, a television, a video camera, a portable navigation device, a smart phone, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image processing device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the sprits of the present invention. Such embodiments and modifications are included in the scope of the invention and the summary described in the present specification, and are included in the invention recited in the claims as well as the equivalent scope thereof.

What is claimed is:

1. An image processing device comprising:
a processor configured to:
acquire a first group of images and a second group of images in which motion of a first object and motion of a second object are captured, respectively;
detect a difference between a posture of the first object and a posture of the second object as a difference between the motion of the first object and the motion of the second object; and
perform control to display, on a display, the first group of images and the second group of images such that a difference between a first speed of motion of the first object and a second speed of motion of the second object is adjusted for displaying on the display, based on the difference between the motion of the first object and the motion of the second object, in a case in which the processor detects the difference between the posture of the first object and the posture of the second object,
wherein the processor is configured to perform control to display, on the display, an index indicating a direction or a magnitude of the difference between the motion of the first object in the first group of images and the motion of the second object in the second group of images.

2. The image processing device according to claim 1, wherein the processor is configured to adjust the difference between the first speed of motion of the first object and the second speed of motion of the second object by thinning out one of the first group of images and the second group of images corresponding to a slower one of the first speed of motion of the first object and the second speed of motion of the second object.

3. The image processing device according to claim 1, wherein the processor is configured to adjust the difference between the first speed of motion of the first object and the second speed of motion of the second object by interpolating one of the first group of images and the second group of images corresponding to a faster one of the first speed of motion of the first object and the second speed of motion of the second object.

4. The image processing device according to claim 1, wherein the is configured to perform control to display, on the display, the first group of images and the second group of images such that one of the first group of images and the second group of images is more noticeable than the other of the first group of images and the second group of images, frames of the one of the first group of images and the second group of images being a target to be adjusted for displaying.

5. The image processing device according to claim 1, wherein the processor is configured to set, on the first group of images, a first line which is a reference of motion of the first object, and detect posture of the first object is different from the posture of the second object by comparing the first line and a second line which is set on the second group of images.

6. The image processing device according to claim 1, wherein the processor is configured to extract an outline of the first object and the second object, and set the first line and the second line based on an edge point and a bending point of the outlines extracted by the outline extracting unit.

7. The image processing device according to claim 1, wherein the processor is configured to perform control to display, on the display, information corresponding to a detecting the difference between the posture of the first object and the posture of the second object.

8. An image processing method for an image processing device, the method comprising:
   acquiring a first group of images and a second group of images in which motion of a first object and motion of a second object are captured, respectively;
   detecting a difference between a posture of the first object and a posture of the second object as a difference between the motion of the first object and the motion of the second object; and
   performing control to display, on a display, the first group of images and the second group of images such that a difference between a first speed of motion of the first object and a second speed of motion of the second object is adjusted for displaying on the display, based on the difference between the motion of the first object and the motion of the second object, in a case in which the difference between the posture of the first object and the posture of the second object is detected,
   wherein detecting the difference comprises setting, on the first group of images, a first line which is a reference of motion of the first object, and detecting whether the posture of the first object is different from the posture of the second object by comparing the first line and a second line which is set on the second group of images.

9. A non-transitory computer-readable medium having stored thereon a program that is executable by a computer of an image processing device, the program being executable by the computer to cause the computer to perform functions comprising:
   acquiring a first group of images and a second group of images in which motion of a first object and motion of a second object are captured, respectively;
   detecting a difference between a posture of the first object and a posture of the second object as a difference between the motion of the first object and the motion of the second object;
   performing control to display, on a display, the first group of images and the second group of images such that a difference between a first speed of motion of the first object and a second speed of motion of the second object is adjusted for displaying on the display, based on the difference between the motion of the first object and the motion of the second object, in a case in which the difference between the posture of the first object and the posture of the second object is detected; and
   performing control to display, on the display, an index indicating a direction or a magnitude of the difference between the motion of the first object in the first group of images and the motion of the second object in the second group of images.

10. The image processing device according to claim 1, wherein the processor is configured to adjust the difference between the first speed of motion of the first object and the second speed of motion of the second object for displaying on the display to correct the difference between the motion of the first object and the motion of the second object.

11. The image processing device according to claim 6, wherein the processor is configured to detect a difference between the first line and the second line; and
   wherein the processor is configured to perform control to display, on the display, the first group of images and the second group of images such that the difference between the first speed of motion of the first object and the second speed of motion of the second object is adjusted for displaying on the display, based on the difference between the first line and the second line, in a case in which the processor detects the difference between the posture of the first object and the posture of the second object.

12. The image processing device according to claim 11, wherein the processor is configured to adjust the difference between the first speed of motion of the first object and the second speed of motion of the second object for displaying on the display to correct the difference between the first line and the second line.

13. The image processing device according to claim 1, wherein the processor is configured to detect a difference between a timing of motion of the first object and a timing of motion of the second object as the difference between the motion of the first object and the motion of the second object, and
   wherein the processor is configured to adjust the difference between the first speed of motion of the first object and the second speed of motion of the second object for displaying on the display based on the difference between the timing of motion of the first object and the timing of motion of the second object.

14. The image processing device according to claim 1, wherein the motion of the first object and the motion of the second object include a motion of a golf swing.

15. The image processing device according to claim 1, wherein the processor is configured to:
   determine whether the first speed of motion of the first object is different from the second speed of motion of the second object; and
   perform control to display on a display, the first group of images and the second group of images such that the difference between the first speed of motion of the first object and the second speed of motion of the second object is adjusted for displaying on the display, based on the difference between the motion of the first object and the motion of the second object, in a case in which the processor determines that the first speed of motion of the first object is different from the second speed of motion of the second object.

16. The image processing device according to claim 1, wherein the processor is configured to detect the difference between the posture of the first object and the posture of the second object as the difference between the motion of the first object and the motion of the second object at each frame among the first group of images and the second group of images.

17. The image processing device according to claim 16, wherein the processor is configured to detect the difference between the posture of the first object and the posture of the second object as a difference in motion timing between the motion of the first object and the motion of the second object at each frame among the first group of images and the second group of images.

18. An image processing device comprising:
a processor which is configured to:
acquire a first group of images and a second group of images in which motion of a first object and motion of a second object are captured, respectively;
set, on the first group of images, a first line which is a reference of motion of the first object;
detect a difference between the motion of the first object and the motion of the second object by comparing the first line and a second line which is set on the second group of images; and
perform control to display, on a display, the first group of images and the second group of images such that a difference between a first speed of motion of the first object and a second speed of motion of the second object is adjusted for displaying on the display, in a case in which the processor detects the difference between the motion of the first object and the motion of the second object.

19. The image processing device according to claim 18, wherein the processor is configured to:
determine whether a first speed of motion of the first object is different from a second speed of motion of the second object; and
perform control to display, on the display, the first group of images and the second group of images such that the difference between the first speed of motion of the first object and the second speed of motion of the second object is adjusted for displaying on the display based on the difference between the motion of the first object and the motion of the second object, in a case in which the processor determines that the first speed of motion of the first object is different from the second speed of motion of the second object.

20. An image processing method for an image processing device, the method comprising:
acquiring a first group of images and a second group of images in which motion of a first object and motion of a second object are captured, respectively;
detecting a difference between motion of the first object and motion of the second object;
performing control to display, on a display, the first group of images and the second group of images such that a difference between the first speed of motion of the first object and the second speed of motion of the second object is adjusted for displaying on the display, based on the difference between the motion of the first object and the motion of the second object, in a case in which it is detected that the difference between motion of the first object and motion of the second object; and
performing control to display, on the display, an index indicating a direction or a magnitude of the difference between the motion of the first object in the first group of images and the motion of the second object in the second group of images.

* * * * *

UNITED STATES PATENT AND TRADEMARK OFFICE
CERTIFICATE OF CORRECTION

| | | |
|---|---|---|
| PATENT NO. | : 9,466,110 B2 | |
| APPLICATION NO. | : 13/846857 | |
| DATED | : October 11, 2016 | |
| INVENTOR(S) | : Ishige | |

It is certified that error appears in the above-identified patent and that said Letters Patent is hereby corrected as shown below:

In the Claims

Column 19, Line 6, Claim 4 after "the" insert --processor--.

Column 19, Line 16, Claim 5 after "detect" insert --whether the--.

Column 19, Line 27, Claim 7 after "a" insert --result of--.

Signed and Sealed this
Twenty-seventh Day of December, 2016

Michelle K. Lee
*Director of the United States Patent and Trademark Office*